(12) United States Patent
Shi et al.

(10) Patent No.: US 8,524,811 B2
(45) Date of Patent: Sep. 3, 2013

(54) ALGAE-BLENDED COMPOSITIONS FOR THERMOPLASTIC ARTICLES

(75) Inventors: Bo Shi, Neenah, WI (US); James H. Wang, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 473 days.

(21) Appl. No.: 12/430,968

(22) Filed: Apr. 28, 2009

(65) Prior Publication Data

US 2010/0272940 A1 Oct. 28, 2010

(51) Int. Cl.
*C08L 89/00* (2006.01)
*C08L 3/00* (2006.01)
*D21H 19/50* (2006.01)
*D21H 19/54* (2006.01)

(52) U.S. Cl.
USPC .............................. 524/47; 524/17

(58) Field of Classification Search
USPC ..................................... 524/17, 47
See application file for complete search history.

(56) References Cited

U.S. PATENT DOCUMENTS

| | | | |
|---|---|---|---|
| 3,725,291 A | | 4/1973 | Serbus et al. |
| 3,909,468 A * | | 9/1975 | Tanaka et al. ............ 524/9 |
| 4,320,208 A | | 3/1982 | Reischl et al. |
| 4,454,259 A | | 6/1984 | Reischl et al. |
| 4,879,232 A | | 11/1989 | MacDonald et al. |
| 4,913,915 A * | | 4/1990 | Tanaka ................. 426/72 |
| 5,352,709 A | | 10/1994 | Tarrant et al. |
| 5,654,103 A | | 8/1997 | Troadec |
| 5,779,960 A | | 7/1998 | Berlowitz-Tarrant et al. |
| 8,298,374 B2 | | 10/2012 | Shannon et al. |
| 2004/0143068 A1 * | | 7/2004 | Honda et al. ............ 525/199 |
| 2004/0175407 A1 * | | 9/2004 | McDaniel ................. 424/423 |
| 2004/0191200 A1 * | | 9/2004 | Lezer et al. ............... 424/70.11 |
| 2005/0013953 A1 * | | 1/2005 | Ono et al. ................. 428/35.3 |
| 2005/0112350 A1 * | | 5/2005 | Ning ....................... 428/304.4 |
| 2008/0299147 A1 * | | 12/2008 | Dillon et al. ............. 424/195.17 |
| 2009/0163620 A1 * | | 6/2009 | Sumanam ................ 523/351 |
| 2010/0159170 A1 * | | 6/2010 | Wang et al. .............. 428/35.7 |
| 2010/0159203 A1 * | | 6/2010 | Shi et al. ................. 428/159 |

FOREIGN PATENT DOCUMENTS

| | | |
|---|---|---|
| JP | 10-265584 A | 10/1998 |
| WO | WO 2006/079512 A1 | 8/2006 |
| WO | WO 2007/125546 A1 | 11/2007 |
| WO | WO 2008/050945 A1 | 5/2008 |

OTHER PUBLICATIONS

Zhang et al. (J. Mater. Chem. 2000, 10, 2666-2672).*
Chiellini et al. (Biomacromolecules, 2008, 9, 1007-1013).*
Witt et al. (Chemosphere, 44(2), 2001, 289-299).*
Johnson et al. (Journal of Applied Polymer Science, 93, 2469-2477, 2004).*
Article—Elumalai et al., "Ultra Structural Analysis and Lipid Staining of Biodiesel Producing Microalgae—*Chlorella vulgaris* Collected from Various Ponds in Tamil Nadu, India," *Journal of Ecobiotechnology*, vol. 3, No. 1, 2011, pp. 5-7.
Article—Grayburn et al., "Harvesting, oil extraction, and conversion of local filamentous algae growing in wastewater into biodiesel," *International Journal of Energy and Environment*, vol. 4, Issue 2, 2013, pp. 185-190.

* cited by examiner

*Primary Examiner* — Liam Heincer
(74) *Attorney, Agent, or Firm* — Dority & Manning, P.A.

(57) ABSTRACT

A thermoplastic material composition containing certain biodegradable and renewable components is described. The thermoplastic composition that includes a least one kind of algae or a blend of at least one kind of algae and a plant polymer a blend of algae and/or plant-based polymers, such as proteins and starches, as relatively low cost feedstock. The algae or blend may be plasticized. Additionally, a method adapted for large scale fabrication of fibers, films, or extruded articles is also described.

34 Claims, 3 Drawing Sheets

ALGAE-BLENDED COMPOSITIONS FOR THERMOPLASTIC ARTICLES

FIELD OF INVENTION

The present invention relates to polymeric compositions that contain a certain biodegradable and renewable components. In particular, the present invention describes, in part, a thermoplastic composition that includes a blend of algae and/or plant-based polymers, such as proteins and starches, as relatively low cost feedstock.

BACKGROUND

Polymer-based films, fibers or filament structures have been adapted for widespread use in many different applications, such as nonwoven sheets which can be made into a variety of wipers, disposable absorbent products, or protective and healthcare related fabrics. For example, in the infant and child care areas, diapers and training pants have generally replaced reusable cloth absorbent articles. Other typical disposable absorbent products include feminine care products such as sanitary napkins or tampons, adult incontinence products, and health care products such as surgical drapes or wound dressings. A typical disposable absorbent product generally comprises a composite structure including a topsheet, a backsheet, and an absorbent structure between the topsheet and backsheet. These products usually include some type of fastening system for fitting the product onto the wearer.

Disposable absorbent products are typically subjected to one or more liquid insults, such as of water, urine, menses, or blood, during use. As such, the outer cover backsheet materials of the disposable absorbent products are typically made of liquid-insoluble and liquid impermeable materials, such as polyethylene films, that exhibit a sufficient strength and handling capability so that the disposable absorbent product retains its integrity during use by a wearer and does not allow leakage of the liquid insulting the product.

Although current disposable baby diapers and other disposable absorbent products have been generally accepted by the public, these products still have a need of improvement in specific areas. Many disposable absorbent products can be difficult to be compatible with existing waste disposal systems. For example, attempts to flush many disposable absorbent cores or products down a toilet into a sewage system typically lead to blockage of the toilet or pipes connecting the toilet to the sewage system. In particular, the outer cover materials typically used in the disposable absorbent products generally do not disintegrate or disperse when flushed down a toilet so that the disposable absorbent product cannot be disposed of in this way. If the outer cover materials are made very thin in order to reduce the overall bulk of the disposable absorbent product so as to reduce the likelihood of blockage of a toilet or a sewage pipe, then the outer cover material typically will not exhibit sufficient strength to prevent tearing or ripping as the outer cover material is subjected to the stresses of normal use by a wearer.

Furthermore, solid waste disposal is becoming an ever-increasing concern throughout the world. As landfills continue to fill up, there has been an increased demand for material source reduction in disposable products, the incorporation of more recyclable and/or biodegradable components in disposable products, and the design of products that can be disposed of by means other than in solid waste disposal facilities such as landfills. As such, a need exists for new materials that may be incorporated in disposable absorbent products, which generally retain their integrity and strength during use, but the materials can be disposed of more efficiently after use. For example, the disposable absorbent product may be efficiently disposed of by either composting or a liquid sewage system, in which the disposable absorbent product can be easily degraded.

Over the years, different kinds of algae have been adapted for a variety of industrial applications. For instance, adsorbent materials comprising green algae, such as *Chlorella* or *Spirulina*, are adapted to remove toxic and odor in cigarette and air, or using brown algae to remove heavy metals from wastewater with absorbent particle sizes varied from 500 μm~2 mm. Others have used green algae *Chlorella*, in combination with a consortium of prokaryptic microorganisms, to effectively purify wastewater effluent streams using a photobioreactor. Researchers have developed methods to identify algae species and compositions that are effective for lipid production, wastewater and air remediation, or biomass production.

Recent work in adapting algae for industrial uses have concentrated on their refinement as biofuels, which is an outgrowth of increasingly limited fossil fuel resources and relative high cost of petroleum. Biomeal, a leftover waste material from algae to biofuel processing, is normally used for animal feeds. (See, e.g., U.S. Pat. No. 6,338,866 and International Patent Publication No. WO 01/60166 to Criggall et al., which developed methods to manufacture pet or animal foods using such a waste product which includes the cell carcasses that remain after one or more essential fatty acids such as docosahexaenoic acid (DHA) have been extracted from lysed algae cells such as *Crypthecodinium cohnii*; WO Publication No. 2008/039911 to Lo et al. provides a method of optimizing pet food palatable components comprising algal biomeal.)

U.S. Pat. Nos. 5,352,709, 5,779,960, and EP Patent No. 702,703 to Tarrant et al. deal with plastic applications of algal material. Specifically, Tarrant et al. used filamentous algae such as *Clodophora glomerata* to generate foamed packing materials (e.g. packing peanuts). U.S. Pat. No. 5,654,103 to Troadec used alginate of algal origin, together with an aqueous solvent and a plasticizer to form films. Similarly WO Publication No. 00/11069 to Kunstmann used naturally growing raw materials such as algae for producing at least 3% alginate and further reacting with calcium ion and foaming agent for production of foamed articles for packaging applications. Johnson and Shivkumar (2004) collected *Clodophora glomerata* and *Pithophora oedegonia* from rivers and streams in California for making isocynanate-based foams. WO Publication No. 2007/079719 to Koryszczuk dealt with the use algae in composites. U.S. Patent Publication No. 2008/0057547 to You et al. disclosed a method of using red algae—*Rhodophyta* for manufacturing pulp and paper through immersing algae into an extraction solvent to dissolve agar gel which is then reacted with a reaction solvent that contains oxidizing agents for fiber conversion and pulping. Structurally speaking, red algae are not microalgae, on which this invention is focused. Lee et al. made red algae and poly(butylene succinate) biocomposites using a compression molding technique. (Lee, M. W., Han, S. O., and Seo, Y. B. (2008), *Red Algae Fibre/Poly(butylene succinate) Biocomposites: The Effect of Fibre Content on Their Mechanical and Thermal Properties*, COMPOSITE SCI. AND TECHNOLOGY, Vol. 68, 1266~1272.)

Chiellini et al. used green algae, *Ulva armoricana*, to produce hybrid polyvinyl alcohol-based composites by solution casting and melt processing, respectively. The latter was based on a torque rheometer connected to plastograph to produce pellets containing up to 30% of algae. Soil burial testing was conducted to assess the composite biodegradation. A 70% mineralization of the composite was achieved in about two months. (Chiellini, E., Cinelli, P. LLieva, V. I., and Martera, M. (2008), *Biodegradable Thermoplastic Composites Based on Polyvinyl Alcohol and Algae*, BIOMACROMOLECULES, Vol. 9, 1007~1013.)

Several papers by Zhang et al. (2000 a and b), and Otsuki et al. (2004) addressed techniques to incorporate *Chlorella*, a kind of microalgae belonging to the Chlorophyceae, into polypropylene, polyethylene, and polyvinyl chloride, respectively, to create novel industrial materials. These blends were made by a modification of synthetic polymers and a roller mixer was used obtain composite samples under heat-pressurizing and molding. These steps were tedious in laboratory and not suitable for industrial-wide production such as utilizing an extrusion technology. (Zhang, F., Endo, T., Kitagawa, R., Kabeya, H., and Hirotsu, T. (2000a), *Synthesis and Characterization of a Novel Blend of Polypropylene with Chlorella*, J. MATER. CHEM., Vol. 10, 2666~2672; Zhang, F., Kabeya, H., Kitagawa, R., and Hisrotsu, T. (2000b), *An Exploratory Research of PVC-Chlorella Composite Material (PCCM) as Effective Utilization of Chloralla Biologically Fixing $CO_2$*. J. MATER. SCI., Vol. 35, 2603~2609; Otsuki, T., Zhang, F., Kabeya, H., and Histosu, T. (2004), *Synthesis and Tensile Properties of a Novel Composite of Chorella and Polyethylene*, J. APPLIED POLYMER SCI., Vol. 92, 812~816.)

But in some cases, biomeal is treated as a waste and disposed of in landfills. Therefore, a value-added utilization of the biomeal will be a very attractive approach. Activities in algae production and utilization will increase in the future because there is a need to reduce global warming and cleaning up of wastewater effluent. On the other hand, petroleum-based oil products that predominate in the energy market today are not sustainable. As a result, it is expected that there is a large amount of algae to be used for biofuel refining processes described in U.S. Patent Application Publications 2008/0155888 to Vick et al. and 2008/0090284 to Hazlebeck et al. Biomeal or a leftover material from algae to biofuel refining processes will be abundantly available because the estimated algal meal as a byproduct is 0.77 lb for every pound of algae processed for oil. Therefore, effective utilization of such a waste material in plastic manufacturing become important to any business that is currently depending on petroleum as a feedstock. It is one of renewable material sources, particularly when petroleum diminishes in the future.

SUMMARY OF THE INVENTION

The present invention enables fabricators to use microalgae as a sustainable and renewable material for plastic manufacturing, to develop a novel and efficient thermoplastic processing method to produce articles using the thermoplastic algae for plastic applications such as, but not limited to, personal care products, agriculture films, containers, building materials, electrical apparatus, and automobile parts.

The present invention concerns, in part, a thermoplastic composition that is desirably substantially biodegradable and yet which is easily prepared and able to be readily processed into desired final structures, such as films, fibers or nonwoven structures, or larger extruded or molded, three-dimensional forms. The invention demonstrates an industrial feasibility for manufacturers to incorporate a significant percentage of renewable biomass into polymer blends for the production of biodegradable plastic materials. The amount of biomass present can be up to about 30 wt. % or 35 wt. % in the polymer formulation. This feature can enable producers to be more environmentally sustainable, to enhance Life Cycle Assessment (LCA) benefits, to reduce carbon footprint, to conserve fossil based resources, as well as achieve material cost savings for plastics that traditionally have been derived from with 100% petroleum-based polymers.

According to one aspect, the present invention pertains in part to a thermoplastic polymeric composition that includes at least one kind of algae or a blend of at least one kind of algae and a plant polymer. The algae is present in an amount from about 4 or 5 wt. % to about 30 or 35 wt. % and the plant polymer is a renewable polymeric material, such as starches or proteins, in an amount from about 10 wt. % to about 50 wt. %, and at least one plasticizer in an amount from about 10 wt. % to about 40 wt. %. Generally, the composition exhibits a melting point temperature ($T_m$) ranging from about 60° C. to about 190° C., and multiple glass transition temperatures ($T_g$) ranging from about –40° C. to about 70° C., and inclusive of any sub-ranges or combinations thereof in between. The algae are microalgae with a mean particle size of up to about 100, 110 or 115 microns. The algae-based component constitutes from about 10 wt. % to about 80 wt. % of said composition. Alternatively, the algae and plant polymer-based components are present in a combined amount of about 10 wt. % to about 90 wt. %. The plant polymer can be either a plant-based protein or starch, each of which may constitute about 10 wt. % to about 60 wt. % of the composition. The plasticizer has a pH of from about 1 to about 6.

In another aspect, the present invention concerns films, fibers and filaments prepared from the thermoplastic composition, nonwoven structures incorporating such films, fibers or filaments, and further, various disposable absorbent products may incorporate the nonwoven structures prepared with the composition.

In yet another aspect, the invention pertains to an injection molded article. The article can be formed from a material comprising from about 5 wt. % to about 60 wt. % of a renewable resin and from about 40 wt. % to about 95 wt. % of a petroleum-based synthetic resin, wherein the renewable resin contains at least one plant polymer in an amount from about 25 wt. % to about 85 wt. %, at least one kind of algae in an amount from about 5 wt. % to about 50 wt. %, and at least one plasticizer in an amount from about 5 wt. % to about 50 wt. %.

In another aspect, the present invention concerns a method for fabricating an article from a thermoplastic material. The method involves: a) melting a thermoplastic composition comprising from about 5 wt. % to about 60 wt. % of a renewable resin and from about 5 wt. % to about 40 wt. % of a non-renewable (e.g., petroleum-based) synthetic resin, wherein the renewable resin contains at least one plant polymer in an amount from about 25 wt. % to about 85 wt. %, at least one kind of algae in an amount from about 5 wt. % to about 50 wt. %, and at least one plasticizer in an amount from about 5 wt. % to about 50 wt. %; b) injecting the molten thermoplastic composition into a cavity defined by a molding apparatus; c) cooling the thermoplastic composition in the cavity to form an article; and d) removing the article from the cavity.

Additional features and advantages of the present invention will be revealed in the following detailed description. Both the foregoing summary and the following detailed description and examples are merely representative of the invention, and are intended to provide an overview for understanding the invention as claimed.

Repeat use of references characters in the present specification and drawings is intended to represent same or analogous features or elements of the invention.

DETAILED DESCRIPTION OF THE INVENTION

Section I—Definition

The term "biodegradable," as used herein refers generally to a material that can degrade from the action of naturally occurring microorganisms, such as bacteria, fungi, and algae; environmental heat; moisture; or other environmental factors. If desired, the extent of biodegradability may be determined according to ASTM Test Method 5338.92.

The term "renewable" as used herein refers to a material that can be produced or is derivable from a natural source which is periodically (e.g., annually or perennially) replenished through the actions of plants of terrestrial, aquatic or oceanic ecosystems (e.g., agricultural crops, edible and non-edible grasses, forest products, seaweed, or algae), or microorganisms (e.g., bacteria, fungi, or yeast).

Section II—Description

The present invention describes an innovative use of algae biomass or biomeal, a leftover waste material from the biofuel processing from certain algae species, a contribution towards advancing the use of renewable and biodegradable materials for plastic manufacturing. Algae biomass is expected to be abundant in the future because they are increasingly used to abate air pollution and global warming by assimilating $CO_2$ and uptake of excessive nutrients in the effluent discharged from wastewater treatment plants. When cheap petroleum derived oil becomes scarce, algae could be one of the sustainable and renewable resources for biofuel refining. As a result, biomeal is readily available to be processed for plastic manufacturing, which is important to any businesses that currently rely on petroleum for plastic manufacturing. This invention will enable thermoplastic processing of algae materials, and develop material components such as films, fibers, and inject molded articles for personal care product applications.

Articles such as thermoplastic films useful for personal care product applications are successfully made from a blend of polyester and algae or a blend of polyester, plant polymer, and algae using an extrusion technology. Desirably, the polyester is biodegradable. The thermoplastic composition is capable of being extruded into films, filaments, or fibers that may be incorporated in various nonwoven structures. Such nonwoven structures can be adapted for use in a disposable absorbent product, such as including cleaning wipes, diapers, or other personal hygiene or personal care products that can absorb body fluids, for instance, training pants, adult incontinence products, or feminine hygiene pads. Additionally, the thermoplastic compositions can be used to form molded goods, such as solid forms, tubing, panels, or containers.

Specifically, blue-green algae, for example *Spirulina* and *Nannochloropsis*, in the form of fine powders can be converted surprisingly into thermoplastic materials with and without the presence of plant-based polymers such as starch, wheat gluten, and soy proteins. Success in this conversion step is a major advancement and important to downstream production uses because it enables effective utilization of an attractive renewable and sustainable material for algae-based plastic manufacturing. As used herein, the term "thermoplastic" refers to a polymeric material that softens when exposed to heat and substantially returns to its original condition when cooled to room temperature. As used herein, "biodegradable" refers to a material that degrades from the action of naturally occurring microorganisms such as bacteria or fungi. Currently, algae biomass or biomeal tend to be leftover waste materials that are disposed of in landfills, if it is not utilized as an animal feed. The present invention adapts algae biomass or biomeal to be a commercially advantageous, low-cost material source for plastic manufacturing.

Current efforts to utilize algae or biomeal from the biofuel refining processes for plastic manufacturing have not been well developed and can be complicated. The ability to process algae-based thermoplastic materials is not easily envisioned because it contains multiple constituents such as proteins, carbohydrates, and lipids, which complicates issues at hand. Traditionally, they are handled separately. The present invention provides an advantage over previous large-scale algae polymer material and processing. Most approaches available to utilize algae today are to either modify or pulverize synthetic polymers or grind and extract fibrous algae materials for making foams and composites. None of these approaches is viable for scaled up or industrial-type of applications except for red algae used for pulp and paper manufacturing. Novel use of plant polymers such as starch, wheat gluten, and soy protein, which is chemically compatible and physically miscible with the selected algae, has facilitated thermoplastic conversion processes. The whole processing equipment and operational conditions demonstrated in this invention are scalable to a large production whenever it is in demand.

An advantage of the processing and plastic fabrication method according to the invention complements industrially preferred techniques and can be more easily scaled up for commercial production. Potential applications of the present compositions may include molded thermoplastic materials made for plastic containers (e.g., for wet wipe tubs), elastomeric materials (e.g., for disposable diapers), or films (e.g., for feminine pads and diapers), or flexible packaging materials (e.g., for plastic bags). Methods of making these components can be by means of injection molding or thermal plastic extrusion.

Demonstrative examples for thermoplastic polyester films include a composition of either algae alone or a blend of algae and plant polymers that display desirable mechanical properties. The plasticized algae and plant polymer materials show distinctive melting temperatures and multiple glass transition temperatures, which are not observable for most plant polymers such as starch, wheat gluten and soy protein after they, respectively, have been converted into thermoplastic materials. Certain embodiments that can be made into films exhibit a morphology that indicates a continuous phase dominated by polyester with algae or starch dispersed throughout the film. For instance, an aspect of the present invention can provide a thermoplastic composition that includes polyethylene oxide which exhibits improved processability properties and desirable solubility properties. The composition material may be easily and efficiently formed into a fiber, filament, or film suitable for use in nonwoven structures. Because of the presence of algae biomass and reduced amounts of petrochemical-based polymers and the composition material can be readily degradable in the environment.

Processing of the material composition with algae alone results in high torque and unstable extrusion operations. We have found that addition of plant polymers, such as starches and proteins, however, facilitates converting algae into extrudable thermoplastic materials. The thermoplastic blends of algae and plant polymers should be considered prerequisite or "base" compositions for plastic manufacturing, without which, no films and injection molded articles containing algae could be made efficiently.

The composition has defined thermal properties. The thermoplastic composition can exhibit a melting point temperature ($T_m$) ranging from about 70° C. to about 180° C., and multiple glass transition temperatures ($T_g$) ranging from about −30° C. to about 70° C. Alternatively, the thermoplastic compositions may exhibit a melting point temperature ($T_m$) ranging from about 125° C. to about 140° C., and multiple glass transition temperatures ($T_g$) ranging from about 35° to about 60° C.

The thermoplastic compositions, according to the present invention, include at least one kind of algae or a blend of at least one kind of algae and a plant polymer. The algae can constitute from about 10 wt. % to about 80 wt. % of the composition, or any sub-range or combination there between. Some embodiments may typically include, for example, about 10 wt. % or 12 wt. % up to about 68 wt. % or 75 wt. %, and others may have an algae content of about 15 wt % or 18 wt % to about 40 wt. % or 45 wt. % or 58 wt. %. Alternatively, the thermoplastic material can have a blend of at least one kind of algae and a plant polymer, said algae being in an amount from about 5 wt. % to about 30 wt. % and said plant polymer is a renewable polymeric material in an amount from about 10 wt. % to about 50 wt. %, at least one plasticizer in an amount from about 10 wt. % to about 40 wt. %, and at least one synthetic polymer or one microbial polymer in an amount from about 50 wt. % to about 90 wt. %.

Unlike current conventional techniques for creating blended polymers used grinding or pulverizing techniques to incorporate filamentous or macro-algae such as seaweed, the present compositions incorporate microalgae with a size of up to about 110 μm or 115 μm. Examples of some varieties of algae that are suited for incorporating according to the present invention may include any microalgae, such as *Nannochloropsis, Spirulina,* or *Chlorella*. Typically, the microalgae is in a range from between about 0.05 μm or 0.1 μm up to about 90 μm or 100 μm, inclusive of any sub-range or combination therein. (e.g., about 0.35 μm or 1 μm to about 80 μm or 87 μm, about 5 μm or 8 μm to about 68 μm or 72 μm, about 7 μm or 12 μm to about 82 μm or 95 μm, about 10 μm to about 60 μm, 15 μm or 22 μm to about 55 μm or 65 μm, about 17 μm or 20 μm to about 38 μm or 40 μm.) The algae content can be present in an amount from about 5 wt. % or 7 wt. % to about 30 wt. % or 33 wt. % and inclusive of any sub-range or combinations thereof, such as about 8 wt. % or 10 wt. % to about 25 wt. % or 28 wt. %, or about 5 wt % to about 20 wt. % or 23 wt %.

In some embodiments, according to the present invention, the thermoplastic polymer composition may include a plasticized algae biomass and a thermoplastic polymer. The thermoplastic polymers may include a variety of broad classes of polymers, for example, renewable polymers (e.g., poly-lactic acid (PLA), poly-hydroxyalkanoate (PHA), such as poly(3-hydroxybutyrate), poly(3-hydroxybutyrate-co-4-hydroxybutyrate), poly(3-hydroxybutyrate-co-3-hydroxyvalerate (PHBV), poly(3-hydroxybutyrate-co-3-hydroxyhexanoate), poly(3-hydroxybutyrate-co-3-hydroxyoctanoate), etc.), biodegradable polymers (e.g., aliphatic-aromatic co-polyester, poly(butylene succinate) (PBS), polycaprolactone (PCL), etc.), or non-biodegradable polymers (e.g., polyolefins (e.g., polypropylene, polyethylene), polystyrene, polyesters, polyvinyl-chloride (PVC), poly(acrylonitrile-co-butadiene-co-styrene) (ABS), thermoplastic elastomers, such as polyurethane, styrenic block copolymers (SBC, from KRATON Polymers LLC, Houston, Tex.), etc. In certain other embodiments, one may possibly have algae specific plasticizers such as nitrogen-containing/amino acid type plasticizer either alone or in combination with carbohydrate or other types of plasticizers. Such materials can be adapted for making packaging films, injection molded articles, and absorbent product components having plasticized algae.

Although bio-degradable embodiments are preferred, in certain other embodiments, the algae species (either plasticized or unplasticized) may be combined with certain non-biodegradable polymers or resins (e.g., polyethylene (PE), polypropylene (PP), polyethylene-terephthalate (PET), or other polyesters), for the fabrication of fibers, films or membranes, and rigid or semi-rigid panels. Such non-renewable synthetic polymer materials may comprise about 30 wt. % to about 90 wt. % in certain composition embodiments. Typically, the materials can be present in a range from about 30 wt. % or 35 wt % to about 80 wt. % or 90 wt. %, or alternatively from about 40 wt. % or 45 wt. % to about 70 wt. % or 75 wt. %, inclusive of any range combination there between.

Illustrative of petroleum-based synthetic polymers, for instance, saturated ethylene polymers can be homopolymers or copolymers of ethylene and polypropylene and are essentially linear in structure. As used herein, the term "saturated" refers to polymers which are fully saturated, but also includes polymers containing up to about 5% unsaturation. The homopolymers of ethylene include those prepared under either low pressure, i.e., linear low density or high density polyethylene, or high pressure, i.e., branched or low density polyethylene.

The high density polyethylenes are generally characterized by a density that is about equal to or greater than 0.94 grams per cubic centimeter (g/cc). Generally, the high density polyethylenes useful in the present invention have a density ranging from about 0.94 g/cc to about 0.97 g/cc. The polyethylenes can have a melt index, as measured at 2.16 kg and 190° C., ranging from about 0.005 decigrams per minute (dg/min) to 100 dg/min. Desirably, the polyethylene has a melt index of 0.01 dg/min to about 50 dg/min and more desirably of 0.05 dg/min to about 25 dg/min. Alternatively, mixtures of polyethylene can be used as the base resin in producing the graft copolymer compositions, and such mixtures can have a melt index greater than 0.005 dg/min to less than about 100 dg/min.

The low density polyethylene has a density of less than 0.94 g/cc and are usually in the range of 0.91 g/cc to about 0.93 g/cc. The low density polyethylene polymer has a melt index ranging from about 0.05 dg/min to about 100 dg/min and desirably from 0.05 dg/min to about 20 dg/min. Ultra low density polyethylene can be used in accordance with the present invention. Typically, ultra low density polyethylene has a density of less than 0.90 g/cc.

Generally, polypropylene has a semi-crystalline structure having a molecular weight of about 40,000 or more, a density of about 0.90 g/cc, a melting point of 168.degree. to 171.degree. C. for isotactic polypropylene and a tensile strength of 5000 psi. Polypropylene can also have other tacticities including syndiotactic and atactic.

The above polyolefins can also be manufactured by using the well known multiple-site Ziegler-Natta catalysts or the more recent single-site metallocene catalysts. The metallocene catalyzed polyolefins have better controlled polymer microstructures than polyolefins manufactured using Ziegler-Natta catalysts, including narrower molecular weight distribution, well controlled chemical composition distribution, co-monomer sequence length distribution, and stereoregularity. Metallocene catalysts are known to polymerize propylene into atactic, isotactic, syndiotactic, isotactic-atactic steroblock copolymer.

Copolymers of ethylene which can be useful in the present invention may include copolymers of ethylene with one or more additional polymerizable, unsaturated monomers. Examples of such copolymers include, but are not limited to, copolymers of ethylene and alpha olefins (such as propylene, butene, hexene or octene) including linear low density polyethylene, copolymers of ethylene and vinyl esters of linear or branched carboxylic acids having 1-24 carbon atoms such as ethylene-vinyl acetate copolymers, and copolymers of ethylene and acrylic or methacrylic esters of linear, branched or cyclic alkanols having 1-28 carbon atoms. Examples of these latter copolymers include ethylene-alkyl (meth)acrylate copolymers, such as ethylene-methyl acrylate copolymers.

Similar to the foregoing examples of ethylene polyolefin species, in other iterations, the algae or plasticized algae can be combined with a polymer selected from, for instance, polyether, polyvinylchloride (PVC), polystyrene, polyurethane, and nylon materials. The material can be present in similar proportions as the non-biodegradable components of the composition as stated above.

The algae can be bleached with reduced color ranging from light yellow to off-white, bleaching of algae can be conducted by a number of methods such as chlorine-based bleaching methods used in typical pulp bleaching process or enzyme-based bleaching method.

The plant polymer is a renewable polymeric material, such as a protein or starch. The plant polymer is present in an amount from about 10 wt. % or 12 wt. % to about 45 wt. % or 50 wt. %, inclusive of any sub-range or combinations thereof; for instance, about 10 wt. % or 15 wt. % to about 35 wt. % or 40 wt. %. The plant polymer can contain at least 50% protein, and/or the plant polymer protein may constitute about 10 wt. % to about 60 wt. % of the composition. Certain embodiments may include about 12 or 15 wt. % to about 35 or 40 wt. %, or about 50 or 55 wt. %. The algae and plant polymer are present in a combined total amount of about 10 wt. % to about 90 wt. %.

The plant polymer can be a protein selected from any known in the art and be available as part of a larger formulation, such as an isolate with carbohydrates and fiber. For instance, the plant proteins may include water-insoluble fractions from at least one of the following: corn gluten, wheat gluten, zein, canola, sunflower, sorghum, and soybean (soy protein isolate, soy protein concentrate, soy protein flour), and a combination thereof. Any form of protein may be used, such as isolates, concentrates and flour. For example, soy proteins may be in the form of an isolate containing from about 75 wt. % to about 98 wt. % protein, a concentrate containing from about 50 wt. % to about 75 wt. % protein, or flour containing from about 30 wt. % to about 50 wt. % protein. In certain embodiments, it is desirable to use a protein that is relatively pure, such as those having a protein content of about 75 wt. % or more, and in some cases, about 85 wt. % or more. Gluten proteins, for instance, may be purified by washing away any associated starch to leave a composite of gliadin and glutenin proteins. Examples of such proteins are available from Archer Daniels Midland ("ADM") of Decatur, Ill. Similarly, purified soy protein isolates may be prepared by alkaline extraction of a defatted meal and acid precipitation, a technique well-known and used routinely in the art. Such purified soy proteins are commercially available as Promine R (Central Soya), which is a soy protein isolate having a protein content of approximately 95 wt. %. Other purified soy protein products are also available from DuPont of Louisville, Ky. under the designation PRO-Cote®.

Starch is a natural polymer composed of amylose and amylopectin. Amylose is essentially a linear polymer having a molecular weight in the range of 100,000-500,000, whereas amylopectin is a highly branched polymer having a molecular weight of up to several million. Although starch is produced in many plants, typical sources includes seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. To facilitate the formation of fibers or films in accordance with the present invention, the starch may be chemically modified by processes known in the art (e.g., esterification, etherification, oxidation, acid hydrolysis, enzymatic hydrolysis, etc.). Starch ethers and/or esters may be particularly desirable, such as hydroxyalkyl starches, carboxymethyl starches, etc. The hydroxyalkyl group of hydroxylalkyl starches may contain, for instance, 2 to 10 carbon atoms, in some embodiments from 2 to 6 carbon atoms, and in some embodiments, from 2 to 4 carbon atoms. Representative hydroxyalkyl starches such as hydroxyethyl starch, hydroxypropyl starch, hydroxybutyl starch, and derivatives thereof. Starch esters, for instance, may be prepared using a wide variety of anhydrides (e.g., acetic, propionic, butyric, and so forth), organic acids, acid chlorides, or other esterification reagents. Examples of such starch esters may includes starch acetate, starch butyrate, starch alkanoate, etc. The degree of esterification may vary as desired, such as from 1 to 3 ester groups per glucosidic unit of the starch.

The starch may contain different weight percentages of amylose and amylopectin, different polymer molecular weights, etc. High amylose starches contain greater than about 50% by weight amylose and low amylose starches contain less than about 50% by weight amylose. Although not required, low amylose starches having an amylose content of from about 10% to about 40% by weight, and in some embodiments, from about 15% to about 35% by weight, are particularly suitable for use in the present invention. Examples of such low amylose starches include corn starch and potato starch, both of which have an amylose content of approximately 20% by weight. Such low amylose starches typically have a number average molecular weight ("$M_n$") ranging from about 50,000 to about 1,000,000 grams per mole, in some embodiments from about 75,000 to about 800,000 grams per mole, and in some embodiments, from about 100,000 to about 600,000 grams per mole, as well as a weight average molecular weight ("$M_w$") ranging from about 5,000,000 to about 25,000,000 grams per mole, in some embodiments from about 5,500,000 to about 15,000,000 grams per mole, and in some embodiments, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index may range from about 20 to about 100. The weight and number average molecular weights may be determined by methods known to those skilled in the art. When incorporating a starch, in certain embodiments, the starch can be either a modified or natural, unmodified starch from corn, wheat, or potato.

In addition to plant protein(s) and starch(es), plasticizer(s) may also be employed in the thermoplastic composition to help render the starch and/or plant protein melt-processable. Starches, for instance, normally exist in the form of granules that have a coating or outer membrane that encapsulates the more water-soluble amylose and amylopectin chains within the interior of the granule. When heated, plasticizers may soften and penetrate the outer membrane and cause the inner starch chains to absorb water and swell. This swelling will, at some point, cause the outer shell to rupture and result in an irreversible destructurization of the starch granule. Once destructurized, the starch polymer chains containing amylose and amylopectin polymers, which are initially compressed within the granules, will stretch out and form a generally disordered intermingling of polymer chains. Upon resolidification, however, the chains may reorient themselves to form crystalline or amorphous solids having varying strengths depending on the orientation of the starch polymer chains.

Suitable plasticizers may include, for instance, polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), etc. Also suitable are hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers may include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic carboxylic acids may also be used, such as lactic acid, maleic acid, acrylic acid, copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is preferred, such as less than about 20,000 g/mol, preferably less than about 5,000 g/mol and more preferably less than about 1,000 g/mol.

At least one kind of plasticizer is included in an amount from about 10 wt. % to about 40 wt. %, typically about 12 or 15 wt. % to about 24 or 30 wt. %. The plasticizers may include any polyol such as glycerin, or sorbitol. If desired, the plasticizer may be selected to have a certain pH (refers to the pH prior to incorporation into the thermoplastic composition). In certain embodiments, the plasticizer has a pH of from about 1 to about 6. For example, as indicated above, plasticizers having a relatively low pH can reduce the tendency of gluten proteins to aggregate during melt processing. Thus, when gluten proteins are employed, a plasticizer may be selected that has a pH of about 6 or less, in some embodiments from about 1 to about 5, and in some embodiments, from about 2 to about 4. Examples of such plasticizers may include aliphatic carboxylic acids, such as lactic acid, maleic acid, acrylic acid, etc. In other embodiments, it may be desirable to use plasticizers having a higher pH, such as when the plant protein is not generally sensitive to pH. For example, soy proteins generally lack the cysteine residues that lead to aggregation in gluten proteins. Thus, when employed, the soy protein may be used with plasticizers having a relatively wide range of pH levels. One example of such a plasticizer is glycerol, which has a pH of about 6.

It should be understood that other components may also be included in the thermoplastic composition. According to an embodiment of the invention, thermoplastic films may include a renewable synthetic polymer or microbial polymer. The synthetic polymer is a polyolefin exhibiting a melt flow index 1 to 5 grams per 10 minutes at 190° C. and 2.16 kg weight, and is also biodegradable. The synthetic renewable polymer may include polylactic acid, polybutylene succinate, polybutylene adipate, etc. The synthetic polymers can be synthesized from monomers by polymerization methods. The monomers can be made from renewable resources such as starch via enzymatic depolymerization to monomeric sugars such as glucose, and subsequent fermentation to lactic acid, succinic acid, adipic acid, butanediol, etc. In other embodiments, the synthetic polymer can be a polyurethane with a glass transition temperature at about −70° C. and melting temperature ranging from about 185° C. to about 200° C.

Microbial polymers were produced by either native or genetically modified microorganism via fermentation method. During the fermentation process, renewable feedstock such as sugars, vegetable oil were fed to a fermentation apparatus, the conditions were controlled such that the microorganism accumulate a class of aliphatic polyester: polyhydroxyalkanoate (PHA). PHA comprise of homopolymer of 3-hydroxybutyrate (3-HB) or copolymer of 3-HB with other hydroxyalkanoate monomers such 3-hydroxyvalerate, 4-hydroxybutyrate, 3-hydroxyhexanoate, 3-hydroxyoctanoate, etc. (Please add some paragraphs on PHA descriptions from patents of Metabolix or P&G).

Other components that may be employed is a biodegradable polyester to aid in the fiber and film formation process, including aliphatic polyesters, such as polycaprolactone, polyesteramides, modified polyethylene terephthalate, polylactic acid (PLA) and its copolymers, terpolymers based on polylactic acid, polyglycolic acid, polyalkylene carbonates (such as polyethylene carbonate), poly-3-hydroxybutyrate, (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters, and so forth. When employed, the content of such polyesters is typically minimized to enhance the renewability of the film. For example, such polyester(s) may constitute from about 0.5 wt. % to about 50 wt. %, in some embodiments from about 1 wt. % to about 40 wt. %, and in some embodiments, from about 2 wt. % to about 30 wt. % of the thermoplastic composition.

Aliphatic-aromatic copolyesters, for instance, may be employed in the composition that are synthesized using any known technique, such as through the condensation polymerization of a polyol in conjunction with aliphatic and aromatic dicarboxylic acids, esters, or anhydrides thereof. The polyols may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

The aromatic dicarboxylic acid may include, for instance, terephthalic acid phthalic acid, isophthalic acid, etc., and derivatives thereof, including esters (e.g., monoesters, diesters, etc.), anhydrides (e.g., terephthalic anhydride), and so forth. Suitable esters of terephthalic acid may include alkyl, cycloalkyl and alkoxyalkyl terephthalates, where the alkyl, cycloalkyl and alkoxyalkyl groups generally have from 1 to 30, preferably from 2 to 20 and particularly preferably from 3 to 18, carbon atoms and may be branched or linear. Examples of suitable alkyl terephthalates include, for instance, monomethyl terephthalate, dimethyl terephthalate, diethyl terephthalate, di-n-propyl terephthalate, di-n-butyl terephthalate, di-tert-butyl terephthalate, diisobutyl terephthalate, monoglycol esters of terephthalic acid, diglycol esters of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisoundecyl terephthalate, diisododecyl terephthalate, di-n-octadecyl terephthalate, diisooctadecyl terephthalate, di-n-eicosyl terephthalate, ditridecyl terephthalate, diisotridecyl terephthalate, monocyclohexyl terephthalate, dicyclohexyl terephthalate, etc. Suitable esters of phthalic and/or isophthalic acid may include alkyl, cycloalkyl and alkoxyalkyl phthalates and/or isophthalates, where the alkyl, cycloalkyl and alkoxyalkyl groups generally have from 1 to 30, preferably from 2 to 20 and particularly preferably from 3 to 18, carbon atoms and may be branched or linear. Examples of suitable alkyl phthalates include, for instance, monomethyl phthalate, dimethyl phthalate, diethyl phthalate, di-n-propyl phthalate, di-n-butyl phthalate, di-tert-butyl phthalate, diisobutyl phthalate, monoglycol esters of phthalic acid, diglycol esters of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, di-isoundecyl phthalate, diisododecyl phthalate, di-n-octadecyl phthalate, diisooctadecyl phthalate, di-n-eicosyl phthalate, monocyclohexyl phthalate, dicyclohexyl phthalate, etc. Likewise, suitable isophthalates may include monomethyl isophthalate, dimethyl isophthalate, diethyl isophthalate, di-n-propyl isophthalate, di-n-butyl isophthalate, di-tert-butyl isophthalate, diisobutyl isophthalate, monoglycol esters of isophthalic acid, diglycol esters of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, di-isoundecyl isophthalate, diisododecyl isophthalate, di-n-octadecyl isophthalate, diisooctadecyl isophthalate, di-n-eicosyl isophthalate, monocyclohexyl isophthalate, dicyclohexyl isophthalate, and so forth.

Non-limiting examples of aliphatic dicarboxylic acids include malonic, malic, succinic, oxalic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. Representative aromatic dicarboxylic acids that may be used include substituted and unsubstituted, linear or branched, aromatic dicarboxylic acids selected from aromatic dicarboxylic acids containing 8 or more carbon atoms, and derivatives thereof.

Non-limiting examples of aromatic dicarboxylic acids include terephthalic acid, isophthalic acid, phthalic acid, napthalic acid, as well as derivatives thereof, such as dimethyl terephthalate, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), etc., and mixtures thereof.

The aromatic dicarboxylic acid monomer constituent may be present in the copolyester in an amount of from about 10 mole % to about 45 mole %, in some embodiments from about 15 mole % to about 35 mole %, and in some embodiments, from about 15 mole % to about 30 mole %. The aliphatic dicarboxylic acid monomer constituent may likewise be present in the copolyester in an amount of from about 15 mole % to about 45 mole %, in some embodiments from about 20 mole % to about 40 mole %, and in some embodiments, from about 25 mole % to about 35 mole %. The polyol monomer constituent may be present in the second copolyester in an amount of from about 30 mole % to about 65 mole %, in some embodiments from about 40 mole % to about 50 mole %, and in some embodiments, from about 45 mole % to about 55 mole %.

If desired, a diisocyanate chain extender may be reacted with the copolyester to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri-or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The copolyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, 1,2,4-butanetriol, pentaerythritol, 1,2,6-hexanetriol, sorbitol, 1,1,4,4,-tetrakis (hydroxymethyl)cyclohexane, tris(2-hydroxyethyl)isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic)acid and anhydride, trimesic (1,3,5-benzenetricarboxylic)acid, pyromellitic acid and anhydride, benzenetetracarboxylic acid, benzophenone tetracarboxylic acid, 1,1,2,2-ethane-tetracarboxylic acid, 1,1, 2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

In certain desirable embodiments, the thermoplastic material may further include a aliphatic biodegradable polyester including polylactic acid, poly(3-hydroxyalkanoate), poly(3-hydroxybutyrate), poly(3-hydroxybutyrate-co-3-hydroxy-valerate), poly(3-hydroxybutyrate-co-4-hydroxy-butyrate), (3-hydroxybutyrate-co-4-hydroxy-hexanoate), an aliphatic polyester.

The synthetic polymer can be an aliphatic-aromatic copolyester, a polyolefin, or a polyurethane. The copolyester exhibits a melting point between about 75° C. to about 170° C., and/or may have a glass transition temperature ($T_g$) of about 0° C. or less. The copolyester has the following general structure:

wherein, m is an integer from 2 to 10, in some embodiments from 2 to 4, and in one embodiment, 4; n is an integer from 0 to 18, in some embodiments from 2 to 4, and in one embodiment, 4; p is an integer from 2 to 10, in some embodiments from 2 to 4, and in one embodiment, 4; x is an integer greater than 1; y is an integer greater than 1; and $R_1$ and $R_2$ are independently selected from hydrogen; hydroxyl groups; straight chain or branched, substituted or unsubstituted $C_1$-$C_{10}$ alkyl groups; and straight chain or branched, substituted or unsubstituted $C_1$-$C_{10}$ hydroxalkyl groups.

The synthetic polymer may be an injection-molding grade polyolefin with a melt flow index at about 25 to about 45 grams per 10 minutes under 230° C. and 2.16 kg. The polyolefin may be either polypropylene or polyethylene.

The thermoplastic compostision of this invention can be made by means of a melt mixing process which can be accomplished in a single, twin, or multi-screw extruder apparatus. Alternatively the process can be accomplished by a batch melt mixing device at temperature sufficient to thoroughly melt all the ingredients. This process should be performed at a temperature (e.g, 80-90° C. or 100° C. or 120° C. up to about 200° C. or 220° C.) below the thermal decomposition temperature of the components. The present algae-blended thermoplastic material can be adapted to make various kinds of extrusion-based films or membranes such as packaging films, or injection molded articles, such as containers. When the present thermoplastic material is extruded into a film, the film can have a thickness of between about 5 micrometers to about 200 micrometers, inclusive of any sub-ranges in between or combinations thereof. Typically, for instance, the film has a thickness of from about 5 µm or 8 µm to about 160 µm or 180 µm, or about 10 µm or 12 µm to about 120 µm or 130 µm. In certain embodiments the film thickness can be from about 7 µm or 12 µm to about 60 µm or 80 µm, desirably between about 15 µm or 18 µm to about 35 µm or 55 µm, or alternatively about 9 µm or 11 µm to about 22 µm or 27 µm or 40 µm or 45 µm.

When formed into an injection molded article, the article is formed from a material comprising from about 5 wt. % to about 60 wt. % of a renewable resin and from about 40 wt. % to about 95 wt. % of at least one renewable synthetic resin or renewable microbial resin, wherein the renewable resin contains at least one plant polymer in an amount from about 25 wt. % to about 85 wt. %, at least one kind of algae in an amount from about 5 wt. % to about 50 wt. %, and at least one plasticizer in an amount from about 5 wt. % to about 50 wt. %. The article has a flexural modulus of about 500 Newtons per square millimeter or greater.

The thermoplastic material can be fabricated into an article according to a method that may involve: a) providing a thermoplastic composition comprising from about 5 wt. % to about 60 wt. % of a renewable resin and from about 40 wt. % to about 95 wt. % of a petroleum-based synthetic resin, wherein the renewable resin contains at least one plant polymer in an amount from about 25 wt. % to about 85 wt. %, at least one kind of algae in an amount from about 5 wt. % to about 50 wt. %, and at least one plasticizer in an amount from about 5 wt. % to about 50 wt. %; b) injecting said thermoplastic composition into a cavity defined by a molding apparatus; c) cooling said thermoplastic composition in said cavity to form an article; and d) removing said article from said cavity. The thermoplastic material can be extruded at a temperature of about 80° C.-150° C. up to about 190° C., under conditions of melt pressure 5-20 bar, and torque 40-80%.

Section III—Biodegradation

Figure 5:
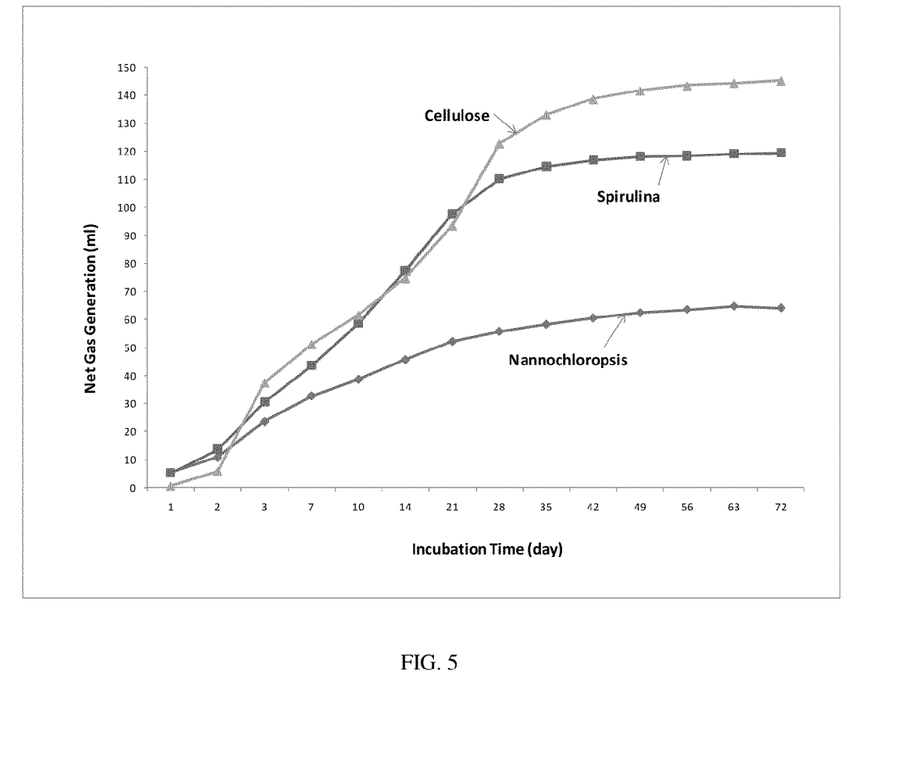
FIG. 5 is a graph comparing the relative effectiveness of biodegradation in terms of net out-gassing for materials incorporating two kinds of algae, *Nannochloropsis* and *Spirulina*, according to two embodiments of the present compositions.

The algae blended thermoplastic compositions can be biodegraded. For instance, FIG. 5 shows a chart of the data comparing anaerobic sludge digestion of two algae samples. The algae biodegradability is assessed using ASTM D5210 protocol. In comparison to cellulose, a reference material, *Nannochloropsis* showed a lower degree of biodegradation. This is because there is high amount of lipids, about 37% in *Nannochloropsis*. On the other hand, *Spirulina*, having a higher amount of protein, achieved its biodegradation comparable to cellulose within the same amount of incubation time at 35° C.

Section IV—Empirical

A. Materials

Two types of blue-green algae such as *Nannochloropsis* and *Spirulina* were obtained from Seambiotic Ltd. (Tel Aviv, Israel) and Earthrise, Calipatria, Calif., respectively. They were used to demonstrate inventive concepts for plastic manufacturing. The former thrives in sea-water bodies, and the latter grows in warm, alkaline fresh-water bodies. They are members of the class Eustigmatophyceae. The algae have both chlorophyll (green) and phycocyanin (blue) pigments in their cellular structure. Once harvested, they are in a form of fine powder with particle sizes at 64 mesh through. The bulk density is 0.35~0.6 kg/liter. The protein and starch compositions are shown in Table 1 for *Spirulina* and *Nannochloropsis*. Total starch content in *Spirulina* is about 4 times greater than that in *Nannochloropsis*, and for total amino acid, it is almost doubled in *Spirulina* in comparison to the one in *Nannochloropsis*. Aspartic and glutamic acids are major components is *Spirulina* whereas amino acids in *Nannochloropsis* are almost evenly distributed. The remaining materials are composed of additional carbohydrates, fats (lipids), minerals (ash), moisture, and fibers.

TABLE 1

Amino Acid and Starch Compositions in the Selected Algae Samples

| Chemical Name | | Spirulina | Nannochloropsis |
|---|---|---|---|
| Carbohydrates | Total Starch | 8.50% | 2.20% |
| Amino Acids | Aspartic Acid | 6.24% | 3.48% |
| | Threonine | 3.42% | 2.16% |
| | Serine | 3.47% | 1.82% |
| | Glutamic Acid | 10.33% | 3.80% |
| | Proline | 3.77% | 2.21% |
| | Glycine | 3.08% | 2.28% |
| | Alanine | 4.61% | 2.75% |
| | Valine | 2.85% | 2.21% |
| | Methionine | 1.42% | 0.93% |
| | Isoleucine | 2.32% | 1.75% |
| | Leucine | 5.05% | 3.52% |
| | Tyrosine | 2.97% | 1.71% |
| | Phenylalanine | 2.59% | 2.11% |
| | Histidine | 1.00% | 0.75% |
| | Lysine | 3.23% | 2.66% |
| | Arginine | 3.99% | 2.47% |
| | Ammonia | 0.86% | 0.73% |
| | Total Amino Acid | 61.20% | 37.34% |

The modified starch, Glucosol 800 polymer purchased from Chemstar (Minneapolis, Minn.), was used for creating some of the examples listed in this invention disclosure. It is a hydroxyproplated corn starch. The modified starch particle sizes pass 98% minimum through 140 mesh, and it is supplied as off-white powder. Other starch materials such as native corn starch, Cargill Gum™ 03460, was purchased from Cargill, Inc. (Minneapolis, Minn.).

Wheat gluten and soy protein PC4200 were purchased from ADM (Decatur, Ill.) and DuPont Soy Polymers (Louisville, Ky.), respectively. Wheat gluten contained a minimum of 75% proteins and the remaining is carbohydrates, about 13%, with 8% moisture. It is a creamy powder. For soy protein, it contained a minimum of 90% proteins.

Processing aids such as glycerin, Emery 916, was purchased from Cognis Corporation, Cincinnati, Ohio. Sorbitol was purchased from Glenn Corporation, White Bear Lake, Minn. Polyethylene glycol (PEG600) was purchased from Sigma-Aldrich, St. Louis, Mo. Hydrogenated palm glyceride, or mono-di-glyceride (Excel P-40S), was purchased from Kao Corporation, Tokyo, Japan.

Polyesters such as Ecoflex F BX 7011 was purchased from BASF (Mount Olive, N.J.) and used in examples for making thermoplastic films. Ecoflex F BX 7011 is aliphatic-aromatic copolyester which is composed of three main monomers: butanediol, adipic acid, and terephthalic acid. It is a biodegradable polymer made from petroleum-derived monomers, containing no sustainable and renewable ingredients. In the film fabrication process additional materials can be added, for example, trans pearl green and tans pearl lavender purchased from Chroma Corporation (McHenry, Ill.) for coloring film and injection molded articles; film grade polypropylene Dowlex 2245 purchased from Dow Chemical Co., Midland, Mich.; thermoplastic polyurethane Desmopan DP9370A purchased from Bayer MaterialScience, Pittsburg, Pa.; or injection molding grade polypropylene, SV954, purchased from Basel North America (Bayport, Tex.). The melt flow index is 35 g/10 min. determined at 230° C. and 2.16 kg.

B. Material Processing

Example 1

In theory, the presence of the lipids in algae should facilitate thermoplastic processing. According to this hypothesis, Spirulina, without being mixed with any plant polymers, was extruded using 30% glycerin as a plasticizer and 2% Excel P-40S as a surfactant. Thermo Prism™ USLAB 16 twin screw extruder (Thermo Electron Corporation, Stone, England) was used to complete the processing. It has eleven zones: zone 0 is a feeding zone where the materials from a K-Tron feeder (K-Tron North America, Pitman, N.J.) were accepted and conveyed to the zone 1, 2, etc. till zone 9. These zones are kneading sections of the twin screws, and zone 10 is a die located at the end of the extruder. The temperature setup for Example 1 was 80, 90, 115, 125, 125, 125, 122, 120, and 115° C. from zones 1 to 9. The die temperature was 110° C. The screw rotational speed was 150 rpm. The algae, after being mixed with 2% Excel P-40S, were fed at 1.6 lb/hr. Glycerin was pumped into zone 1 using a gear pump (Bodine Electric Company, Grand Island, N.Y.). At these conditions, the torque was ranged from 65 to 70%, and the pressure was 10~12 bars. When the strand was formed, it was cooled down through a convey belt (Bondie Electric Company, Chicago, Ill.). A pelletizer (Emerson Industrial Controls, Grand Island, N.Y.) was used to cut the strand to produce resin pellets, which was then collected and sealed in a plastic bag.

Example 2

After thermoplastic algae were successfully processed using glycerin, sorbitol was tried as a plasticizer for making a blend of Spirulina/sorbitol (70/30). In addition, surfactant Excel P-40S was added at 2% as well. Other conditions for the extruder were the same as those in Example 1, except for the fact that there was no glycerin pumping. However, the extruder torque was 70~75%, and the pressure was high and fluctuated between 25~25 bars. No strand could be formed. As a result, algae could not be processed when sorbitol was used as the plasticizer.

Example 3

Instead of using sorbitol as the plasticizer in Example 2, polyethylene glycol (PEG 600) was used as a plasticizer in Example 3. The temperature profile and other processing conditions were the same as those in Example 2. The extruder torque was low this time at 40 to 45%, and the pressure was at 6 bars. However, algae could not be converted into thermoplastic materials.

Examples 4-7

The toque during algae processing in Example 1 was fairly high. In order to further demonstrate algae processability, native corn starch was selected to co-process with algae. Table 2 listed thermoplastic processing conditions for Thermo Prism™ USLAB 16 twin screw extruder (Thermo Electron Corporation, Stone, England). One K-Tron feeder (K-Tron North America, Pitman, N.J.) was used to feed a mixture of algae, starch and surfactant at ratios shown in Table 2 into the extruder zone 0, and glycerin was pumped into zone 1 at 28% of the mixture using the gear pump (Bodine Electric Company, Grand Island, N.Y.). Example 4 used native corn starch alone without the presence of algae. While glycerin and surfactant were fixed in all blends, starch and algae ratio was changed as 70/30 for Example 5, 60/40 for Example 6, and 30/70 for Example 7. In comparison to Example 1, both melt pressure and torque were reduced when starch was co-processed with algae, which was true as well when Examples 5, 6, and 7 are compared to Example 4. The converting process was good. Strands from the die was cut and stored in plastic bags.

TABLE 2

Processing Conditions for Native Corn Starch and *Spirulina* on Thermo Prism Extruder

| Sample No. | Mixture Feeding Rate (lb/hr) | Blend Composition Corn Starch % | Excel P-40S % | *Spirulina* % | Extruder Speed (rpm) | Extruder Temperature Profile (° C.) | | | | | | | | | | $P_{melt}$ (bar) | Torque (%) |
|---|---|---|---|---|---|---|---|---|---|---|---|---|---|---|---|---|---|
| | | | | | | $T_1$ | $T_2$ | $T_3$ | $T_4$ | $T_5$ | $T_6$ | $T_7$ | $T_8$ | $T_9$ | $T_{die}$ | | |
| Example 4 | 2.3 | 98 | 2 | 0 | 150 | 80 | 90 | 115 | 120 | 130 | 130 | 130 | 120 | 115 | 110 | 9~10 | 55~60 |
| Example 5 | 1.6 | 68.6 | 2 | 29.4 | 150 | 80 | 90 | 115 | 120 | 125 | 125 | 125 | 122 | 120 | 110 | 7~8 | 50~54 |
| Example 6 | 1.6 | 58.8 | 2 | 39.2 | 150 | 80 | 90 | 115 | 120 | 125 | 125 | 125 | 122 | 120 | 110 | 6~8 | 45~50 |
| Example 7 | 1.6 | 29.4 | 2 | 68.6 | 150 | 80 | 90 | 115 | 120 | 125 | 125 | 125 | 122 | 120 | 110 | 5~6 | 50~55 |

Examples 8-11

Glucosol 800 is a modified corn starch, which was also used to demonstrate processability. Table 3 showed thermoplastic processing conditions for Thermo Prism™ USLAB 16 twin screw extruder (Thermo Electron Corporation, Stone, England). Examples 8 used Glucosol 800 starch alone without the presence of algae. Examples 9 and 10 used *Spirulina*, and Example 11 used *Nannochloropsis* to be blended with Glucosol 800. Generally, plasticizer required in order to process these blends is at 22%, less than that for native corn starch and algae blends. The ratio of Glucosol 800 to algae is 70/30 for Example 9, and 30/70 for Examples 10 and 11. In comparison, a lower torque than Glucosol 800 alone was observed, and the strand formed was also more flexible.

Examples 12-16

Plant protein materials such as wheat gluten and soy protein were used in Examples 12 to 16. In all these examples, glycerin was fixed at 30%. The strand could not be formed when wheat gluten as a majority at 68.6% in Example 12. The strand could be formed, but brittle, for Example 13 when *Spirulina* as a majority. In this case, the presence of lipids in algae may be beneficial. Example 14 used *Nannochloropsis* at 68.6% in the mixture for thermoplastic processing. The strand improved versus the one in Example 13. However, the skin on strand was slightly rough, although torque was reduced significantly, shown in Table 4. Example 15 used soy protein as a majority for the blend with algae. However, the

TABLE 3

Processing Conditions for Glucosol 800 and *Spirulina/Nannochloropsis* on Thermo Prism Extruder

| Sample No. | Mixture Feeding Rate (lb/hr) | Blend Composition Glucosol 800 % | Excel P-40S % | Algae % | Extruder Speed (rpm) | Extruder Temperature Profile (° C.) | | | | | | | | | | $P_{melt}$ (bar) | Torque (%) |
|---|---|---|---|---|---|---|---|---|---|---|---|---|---|---|---|---|---|
| | | | | | | $T_1$ | $T_2$ | $T_3$ | $T_4$ | $T_5$ | $T_6$ | $T_7$ | $T_8$ | $T_9$ | $T_{die}$ | | |
| Example 8 | 2.3 | 98 | 2 | 0 | 150 | 80 | 90 | 115 | 120 | 130 | 130 | 130 | 120 | 115 | 110 | 6~7 | 60~65 |
| Example 9 | 1.6 | 68.6 | 2 | 29.4 | 150 | 80 | 90 | 115 | 120 | 125 | 125 | 125 | 122 | 120 | 110 | 7~8 | 50~55 |
| Example 10 | 1.6 | 29.4 | 2 | 68.6 | 150 | 80 | 90 | 115 | 120 | 125 | 125 | 125 | 122 | 120 | 110 | 10~11 | 55~60 |
| Example 11 | 1.6 | 29.4 | 2 | 68.6* | 150 | 80 | 90 | 115 | 120 | 125 | 125 | 125 | 122 | 120 | 110 | 8~9 | 40~45 |

*Example 11 used *nannochloropsis* for the blend strand was rough and brittle, and melt pressure was high as well. No sample was collected. Example 16 used algae as a majority for the blend. The strand could be formed, but showed a big circle on the floor after the convey belt.

TABLE 4

Processing Conditions for Wheat Gluten/Soy Protein and *Spirulina* or *Nannochloropsis* on Thermo Prism Extruder

| Sample No. | Mixture Feeding Rate (lb/hr) | Blend Composition Plant Protien % | Excel P-40S % | Algae % | Extruder Speed (rpm) | Extruder Temperature Profile (° C.) | | | | | | | | | | $P_{melt}$ (bar) | Torque (%) |
|---|---|---|---|---|---|---|---|---|---|---|---|---|---|---|---|---|---|
| | | | | | | $T_1$ | $T_2$ | $T_3$ | $T_4$ | $T_5$ | $T_6$ | $T_7$ | $T_8$ | $T_9$ | $T_{die}$ | | |
| Example 12 | 1.6 | 68.6 | 2 | 29.4 | 150 | 80 | 90 | 115 | 120 | 125 | 125 | 125 | 120 | 115 | 110 | 11~12 | 38~40 |
| Example 13 | 1.6 | 29.4 | 2 | 68.6 | 150 | 80 | 90 | 115 | 120 | 125 | 125 | 125 | 122 | 120 | 110 | 9~10 | 45~50 |
| Example 14 | 1.6 | 29.4 | 2 | 68.6* | 150 | 80 | 90 | 115 | 120 | 125 | 125 | 125 | 122 | 120 | 110 | 8~9 | 30~35 |

TABLE 4-continued

Processing Conditions for Wheat Gluten/Soy Protein and *Spirulina* or *Nannochloropsis* on Thermo Prism Extruder

| Sample No. | Mixture Feeding Rate (lb/hr) | Blend Composition Plant Protien % | Excel P-40S % | Algae % | Extruder Speed (rpm) | $T_1$ | $T_2$ | $T_3$ | $T_4$ | $T_5$ | $T_6$ | $T_7$ | $T_8$ | $T_9$ | $T_{die}$ | $P_{melt}$ (bar) | Torque (%) |
|---|---|---|---|---|---|---|---|---|---|---|---|---|---|---|---|---|---|
| Example 15 | 1.6 | 68.6& | 2 | 29.4 | 150 | 80 | 90 | 115 | 120 | 125 | 125 | 125 | 122 | 120 | 110 | 18~19 | 55~62 |
| Example 16 | 1.6 | 29.4& | 2 | 68.6 | 150 | 80 | 90 | 115 | 120 | 125 | 125 | 125 | 122 | 120 | 110 | 9~8 | 50~60 |

*Example 14 used *nannochloropsis* for the blend with wheat gluten
&Examples 15 and 16 used soy protein for the blends C. Thermal Properties According to observations obtained during thermoplastic processing of plant polymers and algae, an order of processability can be ranked from easiness to difficulty: modified starch, native corn starch, wheat gluten, and soy protein.

Example 17

The two algae samples were analyzed using a TA Instruments 2050 Thermogravimetric Analyzer. TGA thermograms were recorded for the sample in a platinum pan in the temperature range from a room temperature to 500° C. under dynamic nitrogen atmosphere. A heating rate of 10° C. per minute was used. Table 5 gives the weight loss for the two samples at different temperatures, respectively. *Spirulina* algae sample shows an initial weight loss of ~8% in the temperature range from a room temperature to 200° C. and begins to decompose above that temperature. In the temperature range from 200 to 500° C., the material loses almost 60% of its weight to give a total weight loss of 68%. The *Nannochloropsis* algae lose about 6% of its weight when heated to 180° C. above which temperature it begins to decompose. In the temperature range 180 to 500° C., the material loses 62% of its weight to give a final weight loss of 68% at 500° C.

TABLE 5

TGA Data for the Algae Samples

| Sample ID | Temperature (° C.) | % Weight | Total % Weight Loss |
|---|---|---|---|
| *Spirulina* | Room Temperature | 100 | 0 |
| | 50 | 98.8 | 1.2 |
| | 125 | 93.1 | 6.9 |
| | 200 | 91.6 | 8.4 |
| | 250 | 87.8 | 12.2 |
| | 300 | 69.6 | 30.4 |
| | 400 | 41.5 | 58.5 |
| | 500 | 31.6 | 68.4 |
| *Nannochloropsis* | Room Temperature | 100 | 0 |
| | 50 | 98.6 | 1.4 |
| | 125 | 95.5 | 4.5 |
| | 175 | 94.5 | 5.5 |
| | 320 | 65.9 | 34.1 |
| | 500 | 32.0 | 68.1 |

Example 18

Samples of *Spirulina* and *Nannochloropsis* algae blended with different plant polymer materials such as native/modified starch, wheat gluten, and soy protein were selectively analyzed by differential scanning calorimetry (DSC) as part of an effort to understand its feasibility for plastic manufacturing. TA Instruments Q200 Differential Scanning Calorimeter was used to determine the blend glass transition and meting temperatures. DSC thermograms were recorded for the samples in a sealed aluminum pan in the temperature range −50 to 200° C. under dynamic nitrogen atmosphere. A heating rate of 10° C. per minute was used. Universal analysis NT software provided by TA Instruments was used for analyzing data.

Figure 1:
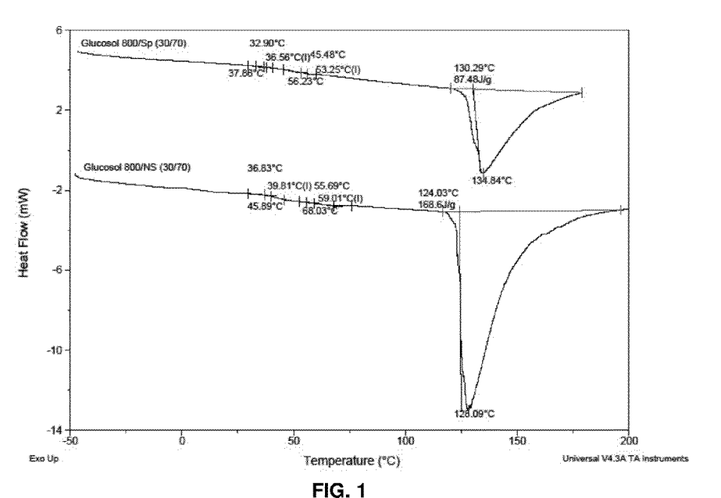
FIG. 1 is a differential scanning calorimetry (DSC) graph representing the relative temperature curves for two sample composition blends according to the present invention.

FIG. 1, showed a DSC chart for two blends of Glucosol 800 and algae. The DSC curve on the top of the chart is for the blend of Glucosol 800 and *Spirulina* and the DSC curve on the bottom of the chart is for the blend of Glucosol 800 and *Nannochloropsis*. Glucosol 800/The thermoplastic composition according to claim 1, wherein said algae includes a plasticized algae or plasticized blend. (30/70) blend shows $T_g$s at 36° C. and 53° C. whereas the Glucosol 800/*Nannochloropsis* blend shows $T_g$s at 40° C. and 59° C. When the weight ratio changes in other blends, multiple $T_g$s were observed as well. Each glass transition temperature is characteristic of the individual polymer component of the blend. Both samples show an endotherm at >125° C. possibly due to decomposition. The melting temperatures were about 135 and 128° C. for Glucosol 800/*Spirulina* (30/70) blend and Glucosol 800/*Nannochloropsis* (30/70) blend, respectively.

D. Thermoplastic Films

Examples 19-23

Ecoflex F BX 7011 control film was cast for Example 19 using for Thermo Prism™ USLAB 16 twin screw extruder (Thermo Electron Corporation, Stone, England), after attaching a 4" inch film die. The temperature profile for the film casting was shown in Table 6, including other processing conditions. The control film thickness was about 1.5 and 2 mils, respectively.

When 30% of the plasticized algae from Example 1 was used in the blend for Example 20, the film casting was good. A variety of the film thicknesses could be produced and collected for mechanical tensile testing. However, the film could not be made when 70% of the plasticized algae from Example 1 was used in the blend for Example 21. The toque was almost doubled during film casting.

Example 22 used the blend of Glucosol 800 and *Spirulina* at (30/70) from Example 10 as one component at 30% and Ecoflex F BX 7011 as another at 70%. One thin film was made successfully. Example 23 used the blend of Glucosol 800 and *Nannochloropsis* at (30/70) from Example 11 as one component at 30% and Ecoflex F BX 7011 as another at 70%. The film with different thickness was made easily. Examples 22 and 23 contain the same amount of starch and Ecoflex F BX 7011, but different type of algae. However, melt pressure and toque in Example 23 were lower than those in Example 22. *Nannochloropsis* in Example 23 may be a contributing factor because it contains less protein more lipids shown in Table 1.

As observed, all film samples that contain algae displayed a blue-greenish color, which can be resolved with the incorporation of certain dyes or colorants such as those commonly added in the polymer industry to change the appearance of the plastic material.

explanation is due to the presence of amino acids such as proline. The blend for Example 20 was used to cast films with two different thicknesses. A thinner film in Example 20 resulted in a lower film elongation in comparison to the control film shown in Example 19. Correspondingly, the film peak stress and modulus are lower as well.

While Ecoflex F BX 7011 and Glucosol 800 contents are the same in Examples 22 and 23, Example 22 contains *Spirulina* and Example 23 contains *Nannochloropsis*. The films obtained display significant differentiation: Example 22 has relatively thicker films while the film in Example 23 is thinner. The film peak stress in Example 22 is lower than those for the films in Example 23 although the film modulus and elongation are similar. These differences are contributed by the type of algae and their affinity with other polymers.

TABLE 6

Thermoplastic Film Blend Ratios and Processing Conditions on Thermo Prism Extruder

| | | Blend Composition | | | | | | | | | | | | | | |
|---|---|---|---|---|---|---|---|---|---|---|---|---|---|---|---|---|
| Sample No. | Feeding Rate (lb/hr) | Algae Blend % | Ecoflex % | Extruder Speed (rpm) | $T_1$ | $T_2$ | $T_3$ | $T_4$ | $T_5$ | $T_6$ | $T_7$ | $T_8$ | $T_9$ | $T_{throat}$ | $T_{die}$ | $P_{melt}$ (bar) | Torque (%) |
| Example 19 | 2 | 0 | 100 | 150 | 120 | 130 | 140 | 145 | 155 | 155 | 160 | 155 | 155 | 155 | 150 | 14~15 | 70~75 |
| Example 20 | 2 | 30% Ex. 1 | 70 | 150 | 120 | 130 | 140 | 145 | 155 | 155 | 160 | 155 | 155 | 155 | 150 | 12~13 | 45~50 |
| Example 21 | 2 | 70% Ex. 1 | 30 | 150 | 120 | 130 | 140 | 145 | 155 | 155 | 160 | 155 | 155 | 155 | 150 | 23~24 | 46~50 |
| Example 22 | 2 | 30% Ex. 10 | 70 | 150 | 120 | 130 | 140 | 145 | 155 | 155 | 160 | 155 | 155 | 155 | 150 | 11~12 | 45~50 |
| Example 23 | 2 | 30% Ex. 11 | 70 | 150 | 120 | 130 | 140 | 145 | 155 | 155 | 160 | 155 | 155 | 155 | 150 | 8~9 | 35~40 |

Film Mechanical Properties

The mechanical tensile properties were determined using Sintech 1/D with five samples tested in both the machine direction (MD) and the cross direction (CD). The film samples were cut into dog-bone shapes with a center width of 3.0 mm before testing. The dog-bone film samples were held in place by grips on the Sintech set to a gauge length of 18.0 mm. During the test, samples were stretched at a crosshead speed of 5.0 inches per minute until breakage occurred. The computer program TestWorks 4 collected data during the test and generated a stress (MPa) versus strain (%) curve from which a variety of properties were determined: e.g., modulus, peak stress and elongation.

Table 7 lists all film mechanical tensile results obtained from Examples 19, 20, 22, and 23. The elongation for the films comprising algae or a blend of algae and starch are very comparable to 100% Ecoflex F BX 7011 film. A plausible

TABLE 7

Thermoplastic Film Mechanical Properties

| | | | Film Mechanical Properties | | | | | | |
|---|---|---|---|---|---|---|---|---|---|
| | | | Film Thickness | | Modulus (MPa) | | Peak Stress (MPa) | | Elongation (%) |
| Sample No. | Sample Description | Composition | MD (mil) | CD (mil) | MD | CD | MD | CD | MD | CD |
| Example 19 | Ecoflex F BX 7011 | 100 | 1.64 | 1.58 | 70 | 90 | 36 | 32 | 464 | 766 |
| Example 20 | Ecoflex/Example 1 | 70/30 | 1.49 | 1.46 | 47 | 45 | 9 | 6 | 150 | 206 |
| | | | 1.89 | 1.87 | 72 | 87 | 20 | 14 | 590 | 626 |
| Example 22 | Ecoflex/Example 10 | 70/30 | 2.32 | 2.44 | 60 | 46 | 11 | 17 | 557 | 589 |
| Example 23 | Ecoflex/Example 11 | 70/30 | 1.36 | 1.26 | 47 | 59 | 16 | 25 | 610 | 589 |

Example 24

Figure 2:
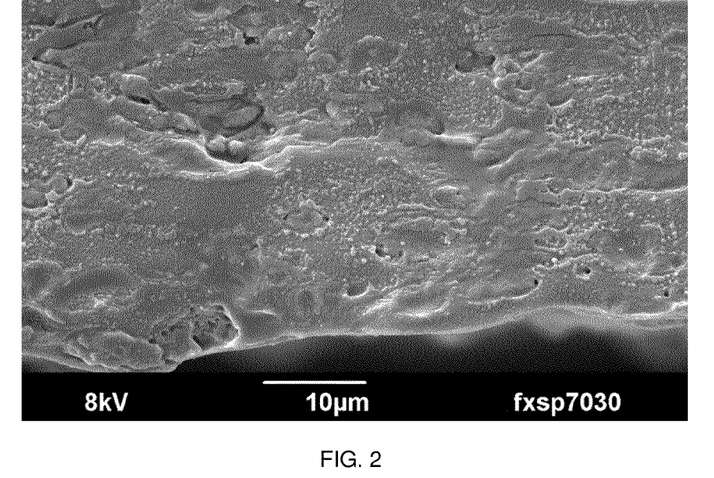
FIG. 2 shows the SEM (Scanning Electron Microscopy) morphology of a film sample made with an embodiment of the compositions according to the present invention of Example 20. It is the blend of ECOFLEX copolyester and plasticized algae without the presence of plant polymer. ECOFLEX copolyester serves as a continuous phase and plasticized algae etched away during SEM, creating valleys visible from the film section.

A method of plasma etching was used to prepare samples for structural profiles by SEM. Similar to wet etching, this method develops topography via differential etch rates of materials. Samples were sectioned at room temperature by impacting a fresh single edge razor through the sample. These preparations were inspected for typical and unusual features and micrographs illustrative of these observations were digitally captured. The film samples from Examples 20, 22, and 23 were selected for SEM studies. FIG. 2 represents the SEM results for the film sample from Example 20, which contains no plant-based biopolymers. While Ecoflex F BX 7011 material served as a continuous phase in the blend, the plasticized algae material etched away during the SEM, creating valleys visible from the film section.

Example 25

Figure 3:
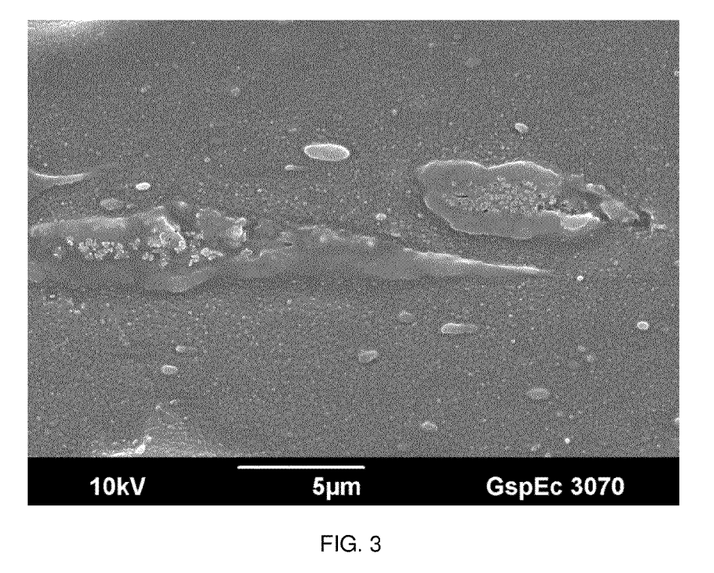
FIG. 3 shows the SEM results for a film sample made with an embodiment of the compositions according to the present invention of Example 22. It shows *Spirulina* is dispersed in the blend

FIG. 3 shows the SEM results for the film sample from Example 22. There are three components co-existing: Glucosol 800 modified starch, *Spirulina*, and Ecoflex F BX 7011 in addition to glycerin which was used as a plasticizer. The data indicate Ecoflex F BX 7011, together with the modified starch, may serve as a continuous phase, whereas algae is dispersed in the blend. The small dots shown in FIG. 3 are likely due to the presence of starch, which could be Glucosol 800 or starch from algae.

Example 26

Figure 4:
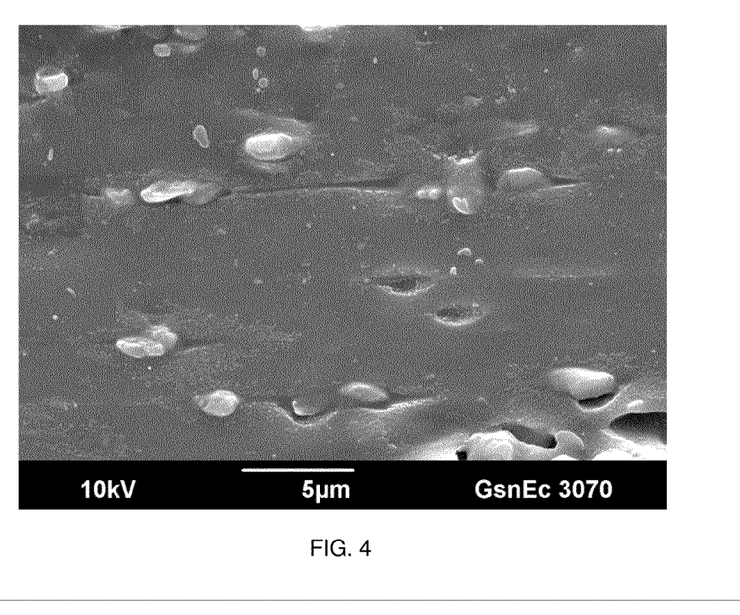
FIG. 4 shows the SEM results for a film sample made with an embodiment of the compositions according to the present invention of Example 23. It shows *Nannochloropsis* is dispersed in the blend.

FIG. 4 indicates the SEM results for the film sample from Example 23. The film sample contains Glucosol 800 modified starch, *Nannochloropsis*, and Ecoflex F BX7011 in addition to glycerin which was used as a plasticizer. *Nannochloropsis* algae dispersed in the matrix comprising Glucosol 800 modified starch and Ecoflex F BX701 1. Again small dots around algae are likely Glucosol 800 modified starch or starch from algae.

Example 27

Dowlex 2245 was dry blended with resins from Example 7 at a ratio of 80/20 for film casting using Thermo Prism™ USLAB 16 twin screw extruder (Thermo Electron Corporation, Stone, England). The processing conditions such as blend feeding rate and temperatures were the same as those shown in Table 6. Melt pressure was 20~22 bars, and torque was 65~70%. The films have average of 2 mil thickness. The film MD and CD elongation is 389 and 567%, respectively. The film MD and CD yield stress is 9 and 7, respectively. In comparison to Dowlex 2245 film (1 mil standard film MD and CD elongation at break is 550 and 650%), the film containing algae has a reduced elongation. Dowlex 2245 1 mil standard film MD and CD yield strength is 10.7 and 10.0 MPa, respectively. Therefore, the film containing algae shows comparable results.

Example 28

Desmopan DP9370A was dry blended with Example 7 at a ratio of 80/20 for film casting using Thermo Prism™ USLAB 16 twin screw extruder (Thermo Electron Corporation, Stone, England). The material feeding rate was 2.5 lb per hour. The processing temperatures from zone 1 to zone 11 were 120, 130, 150, 170, 180, 180, 180, 170, 160, 155, 145° C. The screw rotational speed was 150 rpm, torque was 50~55%, and melt pressure was 15~16 bars. The mechanical tensile results indicate that film MD and CD modulus is 17 and 12 MPa, respectively, the film MD and CD peak stress is 43 and 29, respectively, the film MD and CD elongation is 566 and 703%, respectively.

Example 29

All pellets obtained in Examples 1 and 4~16 displayed a dark color due to the presence of chlorophyll in algae. Pellets from Example 11 are shown in FIG. 5, which is representative of others as well. The color was carried over to the films made in Examples 20, 22, and 23. To resolve the issue, 2% trans pearl green resin was compounded with a mixture of Ecoflex F BX 7011 and Example 11 at a ratio of 70/30, which is the same as Example 23. The compounding of these three resins was accomplished in Thermo Prism™ USLAB 16 twin screw extruder (Thermo Electron Corporation, Stone, England). The operational temperatures were 140, 150, 155, 160, 160, 160, 155, 155, and 150 from zones 1 to 10. The screw speed was 150 rpm, pressure was 18 bars, and torque was 60~65%. The strand was pelletized, collected, and shown in FIG. 5. In comparison, the color of pellets changed from dark in Example 11 to something closer to pearl green. The film obtained thereafter was also shown in FIG. 5. The film processing conditions were the same as those for Example 23.

The method shown above is one way to mask the dark color. Any variation of methods for an incorporation of the coloring resins into film or injection molded articles is conceivable by any skilled persons. For example, the coloring resin—trans pearl green can be directly added during for film casting.

Injection Molded Article

Injection molding is one of the most important processes used to manufacture plastic products. The injection molding process is ideally suited to manufacture mass-produced parts of complex shapes, requiring precise dimensions. The major components for any injection molding machines are the plasticating unit, clamping unit, and the mold. Boy 22D injection machine with the dipronic solid state control from Boy Machines, Inc. (Exton, Pa.) was used to make mold samples in this invention disclosure. The clamping force is 24.2 metric tons, the plasticating unit is 24 mm, and a shot size is 1.2 oz (PS). The mold used was an ASTM D638 standard test specimen mold from Master Precision Products, Inc. (Greenville, Mich.). This mold contains a tensile type I specimen, a round disk, a tensile type V specimen, and izod bar, which can be formed at once during single injection operation.

Example 30

A mixture of 10% pellets from Example 6 and 90% PP SV954 was dry blended with 5% trans pearl lavender for making injection molded articles. The processing temperature profile for heating bands 1 to 3 was 145° C., 148° C., and 150° C., respectively. The nozzle temperature was 153° C., and the mold temperature was set at 80° F. The injection molding cycle began when the mold was closed. At this point, the screw moved forward and injected mixture of resins through the nozzle and into sprue. The material filled the mold (runners, gates, and cavities). During the packing phase, additional material was packed into the cavities while a holding pressure at 95% for 15 seconds was maintained to compensate for material shrinkage. The material was cooled and solidified in the mold while the screw rotated counterclockwise backward, melting the plastic for the next shot. The mold opened and the parts were ejected with a cycle time of 40 seconds. The next cycle begins when the mold closes again. All four components (tensile type I specimen, round disk, tensile type V specimen, and izod bar) were successfully made. Shrinkage on the izod bar was determined 1 hour, 24 hours, and 48 hours, respectively, immediately after it was molded. The shrinkage values in the length and width of izod bar were within 1.3~2%, indicating dimensional stability of the injection molded articles.

Example 31

A mixture of 20% pellets from Example 9 and 80% PP SV954 was dry blended with 5% trans pearl lavender for making injection molded articles. The processing temperature profile for heating bands 1 to 3 was 145° C., 148° C., and 150° C., respectively. The nozzle temperature was 153° C., and the mold temperature was set at 80° F. The injection molding cycle began when the mold was closed. At this point, the screw moved forward and injected mixture of resins through the nozzle and into sprue. The material filled the mold (runners, gates, and cavities). During the packing phase, additional material was packed into the cavities while a holding pressure at 95% for 15 seconds was maintained to compensate for material shrinkage. The material was cooled and solidified in the mold while the screw rotated counterclockwise backward, melting the plastic for the next shot. The mold opened and the parts were ejected with a cycle time of 40 seconds. The next cycle begins when the mold closes again. All four components (tensile type I specimen, round disk, tensile type V specimen, and izod bar) were successfully made. Shrinkage on the izod bar was determined 1 hour, 24 hours, and 48 hours, respectively, immediately after it was molded. The shrinkage values in the length and width of izod bar were within 0.9~1.7%, indicating dimensional stability of the injection molded articles.

The present invention has been described both in general and in detail by way of examples. Persons skilled in the art will understand that the invention is not limited necessarily to the specific embodiments disclosed. Modifications and variations may be made without departing from the scope of the invention as defined by the following claims or their equivalents, including equivalent components presently known, or to be developed, which may be used within the scope of the present invention. Hence, unless changes otherwise depart from the scope of the invention, the changes should be construed as being included herein.

We claim:

1. A thermoplastic composition comprising: (a) from about 10 wt. % to about 50 wt. % of a plasticized microalgae blend, wherein the plasticized microalgae blend comprises from about 10 wt. % to about 80 wt. % of a microalgae powder having a particle size of up to about 115 microns and a plasticizer; and (b) from about 50 wt. % to about 90 wt % of a polymer, wherein the polymer comprises a microbial polymer or a synthetic polymer, wherein the thermoplastic composition exhibits a melting point temperature ($T_m$) ranging from about 60° C. to about 190° C., and multiple glass transition temperatures ($T_g$) ranging from about −40° C. to about 70° C.

2. The thermoplastic composition according to claim 1, wherein said composition exhibits a melting point temperature ($T_m$) ranging from about 125° C. to about 140° C., and multiple glass transition temperatures ($T_g$) ranging from about 35° to about 70° C.

3. The thermoplastic composition according to claim 1, wherein the microalgae powder comprises *Nannochloropsis, Spirulina, Chlorella*, or a combination thereof.

4. The thermoplastic composition according to claim 1, wherein the plasticizer is present in the plasticized microalgae blend in an amount ranging from about 10 wt. % to about 40 wt. % based on the total weight of the blend.

5. The thermoplastic composition according to claim 1, wherein the plasticized microalgae blend further comprises from about 10 wt. % to about 50 wt. % of a plant polymer, wherein the plant polymer comprises a protein, a starch, or a combination thereof.

6. The thermoplastic composition according to claim 5, wherein said protein includes isolates, concentrates and flour and is selected from the group consisting of zein, corn gluten, wheat gluten, canola protein, sunflower protein, sorghum protein, soy protein isolate, soy protein concentrate, soy protein flour, and a combination thereof.

7. The thermoplastic composition according to claim 5, wherein said plant polymer contains at least 50% protein.

8. The thermoplastic composition according to claim 5, wherein said starch is either an unmodified or modified starch from corn, wheat, or potato.

9. The thermoplastic composition according to claim 8, wherein said modified starch is a hydroxyalkyl starch selected from hydroxyethyl starch, hydroxypropyl starch, hydroxybutyl starch and derivatives thereof.

10. The thermoplastic composition according to claim 1, wherein said plasticizer is selected from glycerol, sorbitol and mixtures thereof.

11. The thermoplastic composition of claim 1, wherein said microalgae is a bleached microalgae with reduced color ranging from light yellow to off-white.

12. A thermoplastic film comprising the thermoplastic composition of claim 1.

13. The thermoplastic film according to claim 12, wherein said synthetic polymer or microbial polymer is renewable.

14. The thermoplastic film according to claim 12, wherein said synthetic polymer is a copolyester having a melting point between about 75° C. to about 170° C.

15. The thermoplastic film according to claim 14, wherein said synthetic polymer is a copolyester having a glass transition temperature ($T_g$) of about 0° C. or less.

16. The thermoplastic film according to claim 14, wherein said copolyester has the following general structure:

$$R_1 {+} O-(CH_2)_m-O-\overset{O}{\underset{\|}{C}}-(CH_2)_n-\overset{O}{\underset{\|}{C}}-O {+}_x \left[(CH_2)_p-O-\overset{O}{\underset{\|}{C}}-\underset{}{\underset{}{\bigcirc}}-\overset{O}{\underset{\|}{C}}-O\right]_y R_2$$

wherein,
m is an integer from 2 to 10;
n is an integer from 1 to 18;
p is an integer from 2 to 10;
x is an integer greater than 1;
y is an integer greater than 1;[ and
$R_1$ and $R_2$ are independently selected from hydrogen; hydroxyl groups; straight chain or branched, substituted or unsubstituted $C_1$-$C_{10}$ alkyl groups; and straight chain or branched, substituted or unsubstituted $C_1$-$C_{10}$ hydroxalkyl groups.

17. The thermoplastic film according to claim 12, wherein said synthetic polymer is a polyolefin exhibiting a melt flow index from 1 to 5 grams per 10 minutes at 190° C. and 2.16 kg weight and is also non-biodegradable.

18. The thermoplastic film according to claim 12, wherein said synthetic polymer is a polyurethane with a glass transition temperature at about −70° C. and melting temperature ranging from about 185° C. to about 200° C.

19. The thermoplastic film according to claim 12, wherein the film has a thickness of about 5 micrometers to about 200 micrometers.

20. The thermoplastic film according to claim 12, wherein the microalgae powder comprises *Nannochloropsis, Spirulina, Chlorella*, or a combination thereof.

21. The thermoplastic film according to claim 12, wherein the plasticizer is present in the plasticized microalgae blend in an amount ranging from about 10 wt. % to about 40 wt. % based on the total weight of the blend.

22. The thermoplastic film according to claim 12, wherein the plasticized microalgae blend further comprises from about 10 wt. % to about 50 wt. % of a plant polymer, wherein the plant polymer comprises a protein, a starch, or a combination thereof.

23. An absorbent product comprising a composition or film according to claim 1 or claim 12.

24. The absorbent product according to claim 23, wherein said absorbent product is a personal hygiene product selected from the group consisting of diapers, training pants, adult incontinence products, or feminine hygiene pads.

25. A packaging film comprising a composition or film according to claim 1 or claim 12.

26. An injection molded article comprising a composition or film according to claim 1 or claim 12.

27. An injection molded article, wherein the article is formed from a material comprising from about 5 wt. % to about 60 wt. % of a renewable resin and (a) from about 10 wt. % to about 50 wt. % of a plasticized microalgae blend, wherein the plasticized microalgae blend comprises from about 10 wt. % to about 80 wt. % of a microalgae powder having a particle size of up to about 115 microns and a plasticizer; and (b) from about 50 wt. % to about 90 wt. % of a polymer, wherein the polymer comprises a microbial polymer or a synthetic polymer, wherein the thermoplastic composition exhibits a melting point temperature ($T_m$) ranging from about 60° C. to about 190° C., and multiple glass transition temperatures ($T_g$) ranging from about −40° C. to about 70° C.

28. The injection molded article according to claim 27, wherein said synthetic polymer is an injection-molding grade polyolefin with melt flow index from about 25 to about 45 grams per 10 minutes under 230° C. and 2.16 kg.

29. The injection molded article according to claim 27, further comprising a plant polymer, wherein the plant polymer is a protein selected from: wheat gluten, soy protein isolate, soy protein concentrate, and soy protein flour.

30. The injection molded article according to claim 27, further comprising a plant polymer, wherein the plant polymer is an unmodified or modified starch selected from: corn, wheat, and potato.

31. The injection molded article according to claim 27, wherein the article is a container.

32. The injection molded article according to claim 27, wherein the article has a flexural modulus of about 500 Newtons per square millimeter or greater.

33. A method for fabricating an article from a thermoplastic material, wherein the method comprises a) melting a thermoplastic composition comprising (i) from about 10 wt. % to about 50 wt. % of a plasticized microalgae blend, wherein the plasticized microalgae blend comprises from about 10 wt. % to about 80 wt. % of a microalgae powder having a particle size of up to about 115 microns and a plasticizer; and (ii) from about 50 wt. % to about 90 wt. % of a polymer, wherein the polymer comprises a microbial polymer or a synthetic polymer, wherein the thermoplastic composition exhibits a melting point temperature ($T_m$) ranging from about 60° C. to about 190° C., and multiple glass transition temperatures ($T_g$) ranging from about −40° C. to about 70° C. b) injecting said molten thermoplastic composition into a cavity defined by a molding apparatus; c) cooling said thermoplastic composition in said cavity to form an article; and d) removing said article from said cavity.

34. The method according to claim 33, wherein said thermoplastic material is extruded at about 80° C.-190° C., under conditions of melt pressure 5-20 bar, and torque 40-80%.

* * * * *

UNITED STATES PATENT AND TRADEMARK OFFICE
CERTIFICATE OF CORRECTION

Page 1 of 1

PATENT NO.        : 8,524,811 B2
APPLICATION NO.   : 12/430968
DATED             : September 3, 2013
INVENTOR(S)       : Bo Shi and James H. Wang

It is certified that error appears in the above-identified patent and that said Letters Patent is hereby corrected as shown below:

In the Claims

In Claim 27 (column 29, ll. 24)

"...comprising from about 5 wt. % to about 60 wt. % of a renewable resin and (a) from about 10 wt. % to about 50 wt. %..." should read --...comprising (a) from about 10 wt. % to about 50 wt. %...--

Signed and Sealed this
Fourth Day of February, 2014

Michelle K. Lee
*Deputy Director of the United States Patent and Trademark Office*